United States Patent
Wang et al.

(10) Patent No.: US 11,094,971 B2
(45) Date of Patent: Aug. 17, 2021

(54) METHOD AND SYSTEM FOR BATTERY BINDING

(71) Applicant: KWANG YANG MOTOR CO., LTD., Kaohsiung (TW)

(72) Inventors: Liang-Chi Wang, Kaohsiung (TW); Chung-Jui Hung, Kaohsiung (TW); Yuh-Rey Chen, Taipei (TW); Po-Yu Chuang, Taipei (TW); Jen-Chiun Lin, Taipei (TW); Te-Chuan Liu, Taipei (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 127 days.

(21) Appl. No.: 16/295,963

(22) Filed: Mar. 7, 2019

(65) Prior Publication Data

US 2019/0280344 A1    Sep. 12, 2019

(30) Foreign Application Priority Data

Mar. 9, 2018    (TW) .................................. 107108023

(51) Int. Cl.
*H01M 10/42* (2006.01)
*G06K 7/10* (2006.01)
(Continued)

(52) U.S. Cl.
CPC ......... *H01M 10/4257* (2013.01); *B60L 53/65* (2019.02); *G06K 7/10821* (2013.01);
(Continued)

(58) Field of Classification Search
CPC .. G08B 19/005; G08B 25/008; G08B 27/003;
G08B 29/185; G08B 25/002; G08B 27/005; G08B 3/10; G08B 15/002; G08B 27/00; G08B 5/36; G08B 6/00; G06Q 10/083; G06Q 10/0631; G06Q 10/063; G06Q 30/0201; G06Q 30/0281;
(Continued)

(56) References Cited

U.S. PATENT DOCUMENTS

2008/0001577 A1* 1/2008 Sather ................. B60C 23/0411
320/162
2008/0252457 A1* 10/2008 Findlay ................. G01S 13/825
340/286.01
(Continued)

FOREIGN PATENT DOCUMENTS

EP    2489093 A1    8/2012
FR    2665559 A1    2/1992
(Continued)

OTHER PUBLICATIONS

European Search Report and Written Opinion received for EP Patent Application No. 19155603.4, dated Jul. 12, 2019, 7 pages.

*Primary Examiner* — Daniel Previl
(74) *Attorney, Agent, or Firm* — Womble Bond Dickinson (US) LLP

(57) ABSTRACT

A method for battery binding that is to be implemented by a service end electronic device includes obtaining a carrier identifier corresponding to a carrier device. The method further includes sending the carrier identifier to a battery device via near-field communication for storage in the battery device.

15 Claims, 6 Drawing Sheets

(51) Int. Cl.
*H04B 5/00* (2006.01)
*H01M 10/48* (2006.01)
*B60L 53/65* (2019.01)
*H02J 7/00* (2006.01)

(52) U.S. Cl.
CPC ....... *H01M 10/4221* (2013.01); *H01M 10/48* (2013.01); *H04B 5/0031* (2013.01); *H04B 5/0037* (2013.01); *H01M 2010/4278* (2013.01); *H01M 2220/20* (2013.01); *H02J 7/00045* (2020.01)

(58) Field of Classification Search
CPC .... G06Q 50/28; G06Q 10/08; G06Q 20/3278; G06Q 20/353; G06Q 10/02; G06Q 10/0833; G06Q 20/145; G06Q 20/322; G06Q 20/3224; G06Q 20/357; G06Q 20/40155; G06Q 50/30; H04B 5/0031; H04B 5/0081; H04B 5/0037; G05B 15/02; G05B 2219/2642; B60L 53/66; B60L 53/80; B60L 53/305; B60L 53/60; B60L 53/65; B60L 58/12; B60L 2270/34; G07C 9/00174; G07C 9/22; G07C 9/27; G07C 9/28; G07C 9/33; G07C 2009/0042; G07C 9/00309; G07C 9/00571; G07C 9/00857; H04L 12/2803; H04L 12/2816; H04L 12/2807; H04L 12/283; H04L 67/12; H04L 63/0492; H04L 65/403; H04W 4/029; H04W 4/35; H04W 4/80; H04W 12/0605; H04W 12/0608; H04W 4/00; A47G 29/14; A47G 29/141; F24F 11/30; F24F 11/62; G01C 21/206; G06F 21/31; G06F 21/44; G07F 7/0873; G07F 7/0893; G07F 17/0057; H01M 10/4221; H01M 2010/4278; H01M 2220/20; H01M 10/425; H01M 10/4257; H01M 10/48; H01M 2200/30; H01M 2/341; H01M 2/342
USPC ..... 340/636.1, 572.1–572.9, 636.12, 636.17, 340/636.2, 667, 691.6, 7.32, 7.55
See application file for complete search history.

(56) References Cited

U.S. PATENT DOCUMENTS

| | | | |
|---|---|---|---|
| 2013/0017421 A1* | 1/2013 | Onnerud | H01M 2/34 429/61 |
| 2013/0238238 A1* | 9/2013 | Hsuan | B62K 19/16 701/468 |
| 2014/0120423 A1* | 5/2014 | Matsuo | H01M 4/667 429/217 |
| 2016/0068075 A1* | 3/2016 | Chen | H02J 7/00036 320/107 |
| 2016/0149434 A1* | 5/2016 | Kim | H02J 7/025 320/108 |
| 2018/0037136 A1* | 2/2018 | Nelson | B60L 50/53 |
| 2018/0262891 A1* | 9/2018 | Wu | G07C 9/00857 |
| 2018/0321843 A1* | 11/2018 | Giannotti | G06F 3/04886 |
| 2018/0370594 A1* | 12/2018 | Foley | B62H 5/00 |

FOREIGN PATENT DOCUMENTS

| | | |
|---|---|---|
| WO | 2011/083361 A1 | 7/2011 |
| WO | 2013/080211 A1 | 6/2013 |

* cited by examiner

METHOD AND SYSTEM FOR BATTERY BINDING

CROSS-REFERENCE TO RELATED APPLICATION

This application claims priority of Taiwanese Invention Patent Application No. 107108023, filed on Mar. 9, 2018.

FIELD

The disclosure relates to management of battery devices, and more particularly to techniques for binding battery devices to carrier devices.

BACKGROUND

With people's growing environmental awareness, electric vehicles (EVs) have been developed and are gaining public attention. Conventional electric vehicles use rechargeable and removable batteries installed therein as a source of electrical power. EV owners may purchase or rent the batteries for their use. Since the batteries need to be recharged, they have to be brought to, for example, a charging station from time to time. However, multiple batteries belonging to different owners may be simultaneously present at a charging station, so an EV owner may possibly retrieve a wrong battery (i.e., a battery that belongs to somebody else) when the charging process is finished. A mechanism is needed against such potential mistake.

SUMMARY

Therefore, the present disclosure aims at providing a secure and effective solution for binding batteries to carriers such that a battery can only be used by designated carrier(s). That is, the battery would not provide electrical power to any other carrier. In this way, rights to use the batteries that owners of the carriers bought or rented can be protected.

An object of the disclosure is to provide a method and a system for battery binding that can alleviate at least one of the drawbacks of the prior art.

According to the disclosure, the method is to be implemented by an electronic device. The method includes steps of: obtaining a carrier identifier corresponding to a carrier device; and sending the carrier identifier to a battery device via near-field communication for storage in the battery device.

According to the disclosure, the system includes a carrier device and a battery device configured to be installed in the carrier device to provide electrical power to the carrier device. The system further includes an electronic device capable of communication with the battery device. The electronic device is configured to obtain, from the carrier device, a carrier identifier corresponding to the carrier device. The electronic device is further configured to send the carrier identifier to the battery device via near-field communication for storage in the battery device.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
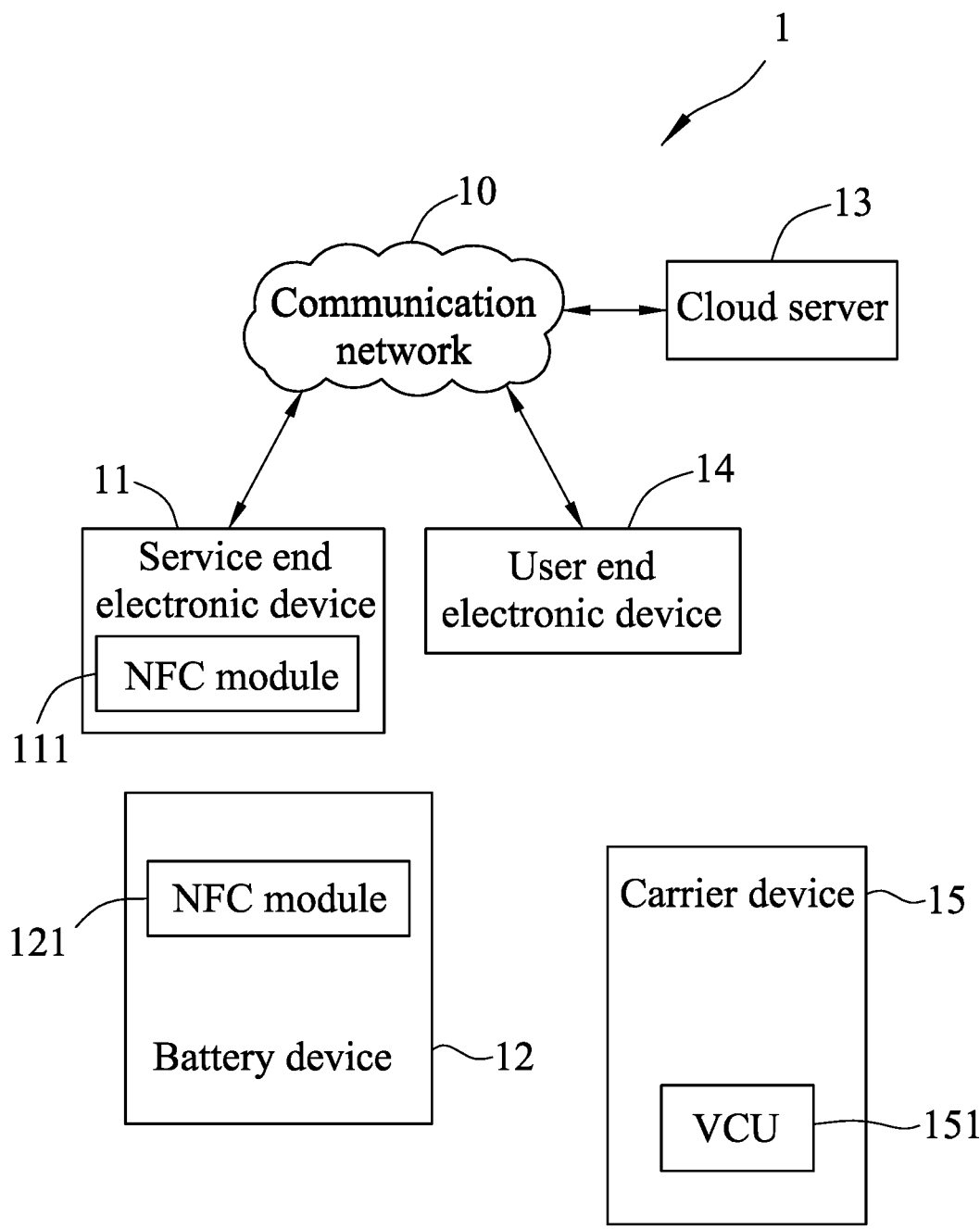
FIG. 1 is a block diagram which exemplarily illustrates a system for battery binding according to an embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram which exemplarily illustrates a system 1 for battery binding according to an embodiment. Referring to FIG. 1, the system 1 includes a service end electronic device 11, at least one battery device 12, a cloud server 13, a user end electronic device 14 and at least one carrier device 15. The service end electronic device 11 and the user end electronic device 14 are configured to communicate with the cloud server 13 over a communication network 10 (e.g., the Internet). In an embodiment, the service end electronic device 11 may be a mobile device of an EV vendor, and the user end electronic device 14 may be a mobile device of an owner/user of one of the carrier device(s) 15.

According to an embodiment, each of the service end electronic device 11 and the battery device(s) 12 includes a near-field communication (NFC) module 111, 121, such that the service end electronic device 11 may communicate with the battery device(s) 12 via near-field communication. According to an embodiment, each of the battery device(s) 12 may further include a controller 122 electrically coupled to the NFC module 121. Each of the battery device(s) 12 may be a removable and rechargeable battery configured to be installed in one of the carrier device (s) 15 to provide electrical power thereto. Each of the carrier device (s) 15 may be a battery electric vehicle (BEV) or a hybrid electric vehicle (hybrid EV) that is a motorcycle, an automobile, a bus or the like.

According to an embodiment, each of the battery device(s) 12 has a unique battery identifier. Before being delivered to a vendor, a barcode associated with the battery identifier of the battery device 12 may be positioned on the battery device 12 (e.g., on a top portion of the battery device 12), such that the battery identifier may be obtained through the barcode. For example, in an embodiment, the service end electronic device 11 may obtain the battery identifier of a battery device 12 by scanning the barcode on the battery device 12 through a first application program installed in the service end electronic device 11 after downloading the same from the cloud server 13 over the communication network 10. The barcode may be a one-dimensional (1D) barcode or a two-dimensional (2D) barcode (e.g., a Quick Response code (QR code)). The battery identifier of the battery device 12 may also be stored in the battery device 12, such that the battery identifier may be obtained through data communication with the battery device 12. For example, in an embodiment, the service end electronic device 11 may obtain the battery identifier of a battery device 12 by communicating with the battery device 12 via near-field communication through the NFC modules 111, 121 thereof.

According to an embodiment, each of the carrier device(s) 15 has a unique carrier identifier. According to an embodiment, before being delivered to a vendor, a barcode associated with the carrier identifier of the carrier device 15 may be positioned on the carrier device 15, such that the carrier identifier may be obtained through the barcode. For example, in an embodiment, the service end electronic device 11 may obtain the carrier identifier of a carrier device 15 by scanning the barcode on the carrier device 15 through the first application program installed in the service end electronic device 11. The barcode may be a 1D barcode or a 2D barcode (e.g., a QR code).

Figure 2:
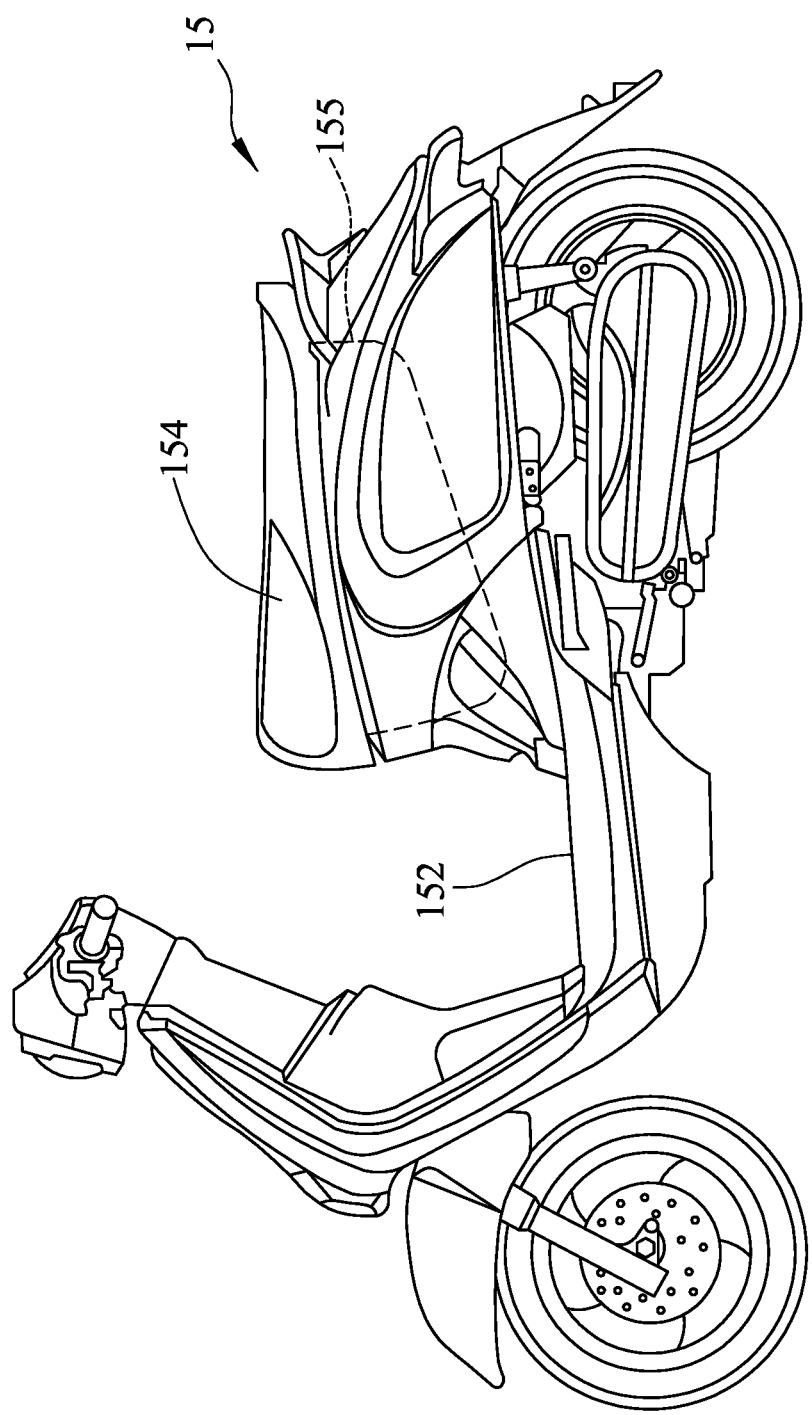
FIG. 2 exemplarily illustrates a carrier device according to an embodiment.
Figure 3:
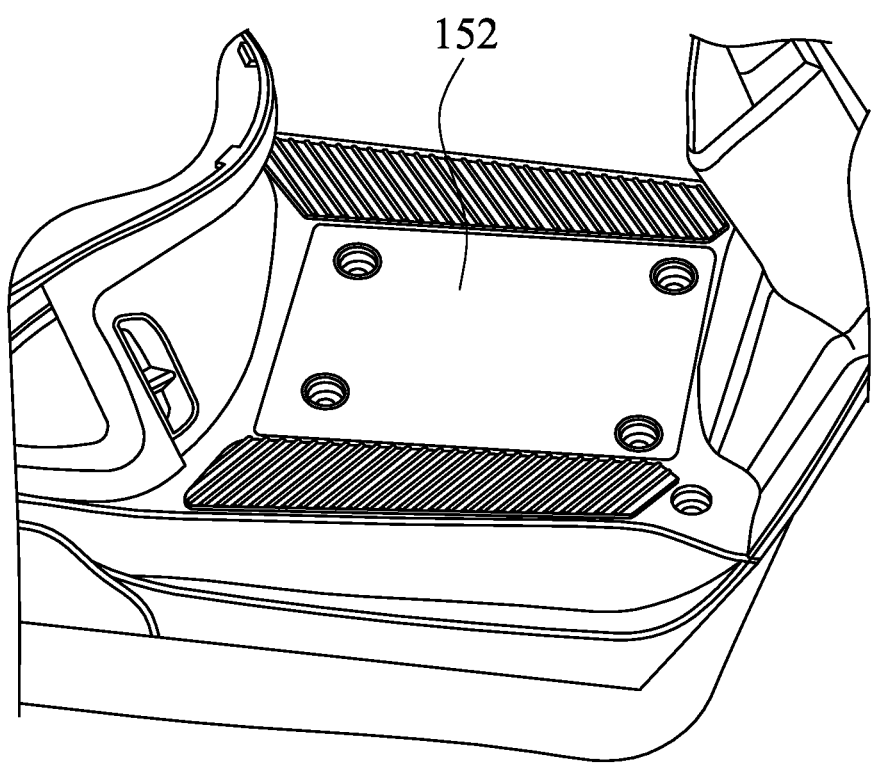
FIG. 3 exemplarily illustrates a footboard of a carrier device according to an embodiment.
Figure 4:
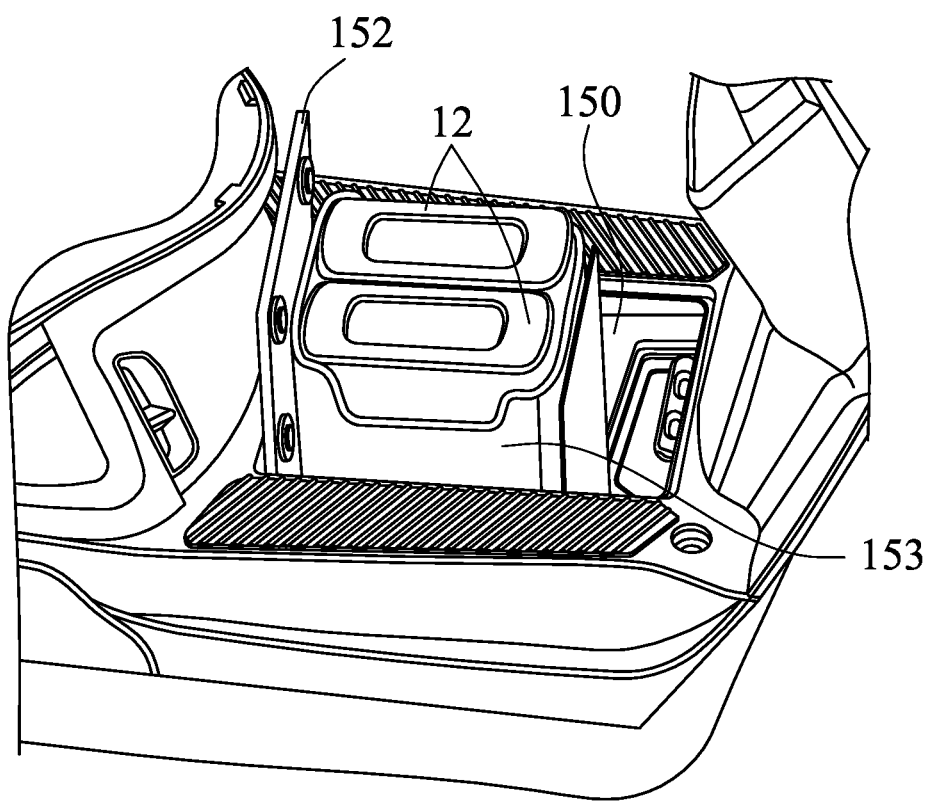
FIG. 4 exemplarily illustrates a battery box of a carrier device according to an embodiment.

FIG. 2 exemplarily illustrates a carrier device 15 according to an embodiment, and FIGS. 3 and 4 further illustrate a footboard portion of the carrier device where a battery box 153 is positioned. Although an electric scooter is illustrated in FIGS. 2-4, the disclosure is not limited thereto.

Referring to FIG. 2, the illustrated carrier device 15 that is an electric scooter has a footboard 152, a seat 154, and a storage compartment 155 under the seat 154. In an embodiment, the barcode associated with the carrier identifier of the carrier device 15 is positioned at a position under the seat 154 or inside the storage compartment 155, but the disclosure is not limited thereto.

Referring to FIGS. 3 and 4, according to an embodiment, a battery box 153 that can receive at least one battery device 12 (for example, two battery devices 12 as illustrated) is positioned in a space 150 under the footboard 152 of the carrier device 15. The battery box 153 may be driven by a motor (not shown) to elevate from the space 150 to reveal the battery device(s) 12, or to descend into the space 150 to conceal the battery device(s) 12. According to an embodiment, the footboard 152 and the battery box 153 are interlocked, such that the footboard 152 opens up the space 150 as the battery box 153 is elevated, and that the footboard 152 closes and covers the space 150 as the battery box 153 descends. In this way, it is easy to take out a battery device 12 from the carrier device 15 when the battery device 12 needs to be replaced or recharged.

The battery device(s) 12 is/are configured to be installed in the battery box 153 to provide electrical power to the carrier device 15. However, only battery device(s) 12 bound to the carrier device 15 is/are permitted to provide electrical power to the carrier device 15. Specifically, each time a battery device 12 is installed in the battery box 153, a vehicle control unit (VCU) 151 (see FIG. 1) of the carrier device 15 determines whether the stored data of the battery device 12 includes the carrier identifier of the carrier device 15 (the carrier identifier may be stored in the VCU 151 in advance during the manufacture of the carrier device 15). If so, the VCU 151 instructs the battery device 12 to provide electrical power to a power supply unit (not shown) fixed in the carrier device 15. If not, the VCU 151 would not instruct the battery device 12 to provide electrical power to the power supply unit of the carrier device 15, and the carrier device 15 cannot receive any electrical power from the battery device 12.

Figure 5:
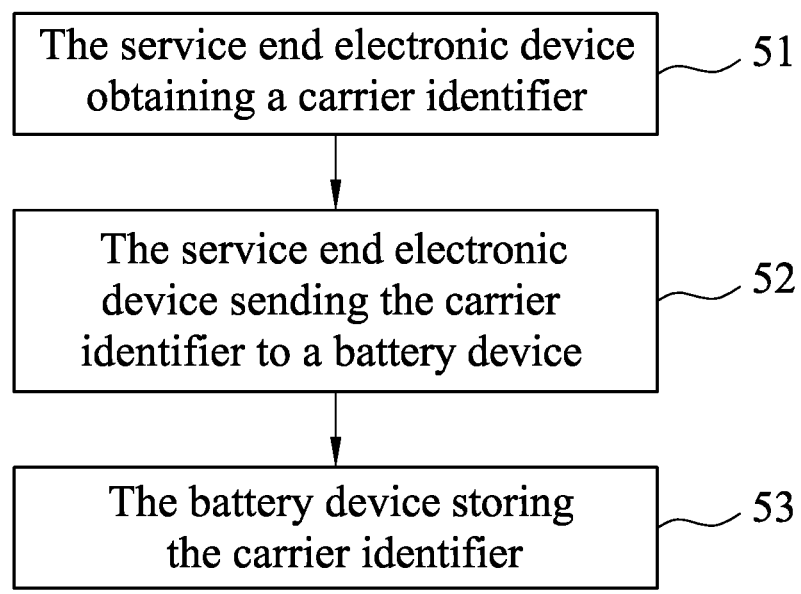
FIG. 5 is a flow chart which exemplarily illustrates a first example of a method for battery binding according to an embodiment.

A method for battery binding may be implemented by the system 1 illustrated in FIG. 1. FIG. 5 exemplarily illustrates a first example of the method according to an embodiment. Referring to FIG. 5, the illustrated method includes steps 51-53. With the method, a battery device 12 can be easily and rapidly bound to a designated carrier device 15 through operation of a service end electronic device 11.

In step 51, the service end electronic device 11 obtains a carrier identifier corresponding to a carrier device 15, and stores the carrier identifier in memory (now shown in FIG. 1) of the service end electronic device 11. The carrier identifier may be obtained through, for example, scanning a barcode on the carrier device 15.

In step 52, the service end electronic device 11 sends the carrier identifier to a battery device 12 through the NFC module 111.

In step 53, the battery device 12 stores the carrier identifier received from the service end electronic device 11 in memory (not shown in FIG. 1) of the battery device 12. The battery device 12 is thus bound to the carrier device 15. That is, the battery device 12 is now permitted to provide electrical power to the carrier device 15.

In a further embodiment, the service end electronic device 11 also obtains and stores a battery identifier of the battery device 12 in step 51, and sends the battery identifier along with the carrier identifier to the battery device 12 in step 52. The battery identifier may be obtained through, for example, scanning a barcode on the battery device 12 or through communication with the battery device 12 via near-field communication.

Figure 6:
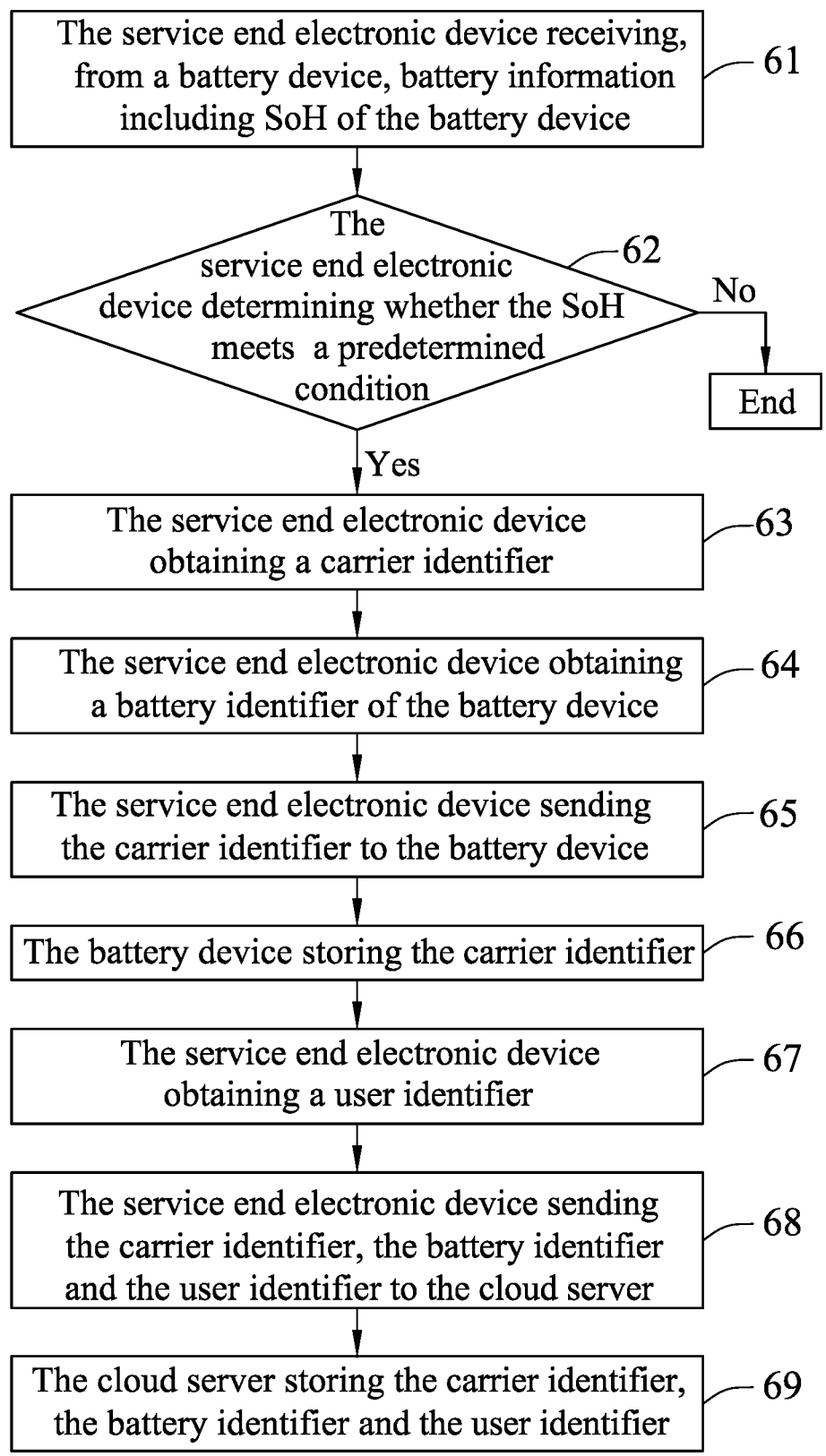
FIG. 6 is a flow chart which exemplarily illustrates a second example of a method for battery binding according to an embodiment.

FIG. 6 exemplarily illustrates a second example of the method for battery binding according to an embodiment. Referring to FIG. 6, the illustrated method is an augmentation of the method illustrated in FIG. 5 and includes steps 61-69.

In step 61, the service end electronic device 11 communicates with a battery device 12 via near-field communication, and receives battery information from the battery device 12 that includes the state of health (SoH) of the battery device 12. The battery information may further include other information of the battery device 12, such as power consumption of battery discharge, remain capacity, capacity of full charge, voltage of the battery, charge/discharge current, cycle count of charge state, charging time, identifier number of the battery, software serial number of battery, and/or hardware serial number of battery. SoH is a ratio (in percentage) of a current, actual battery capacity of the battery device 12 to the specified battery capacity of the battery device 12 at the time of manufacture. A SoH of 100% means that the health condition of the battery device 12 meets its specification at the time of manufacture. Ideally, the SoH of the battery device 12 would be 100% at the time of manufacture, but the SoH may decline over time with use.

In step 62, the service end electronic device 11 compares the SoH of the battery device 12 with a predetermined threshold, and determines whether the relationship between the SoH of the battery device 12 and the predetermined threshold meets a predetermined condition. If so, the process proceeds to step 63; otherwise, the process ends. The predetermined condition may be, for example, the SoH of the battery device 12 being greater than the predetermined threshold. As another example, the predetermined condition may be the SoH of the battery device 12 being not less than the predetermined threshold. An example of the predetermined threshold is 80%.

In step 63, the service end electronic device 11 obtains a carrier identifier corresponding to a carrier device 15, and stores the carrier identifier in the memory of the service end electronic device 11.

In step 64, the service end electronic device 11 obtains a battery identifier of the battery device 12, and stores the battery identifier in the memory of the service end electronic device 11.

In step 65, the service end electronic device 11 sends the carrier identifier to the battery device 12 through the NFC module 111. In a further embodiment, the service end electronic device 11 sends the battery identifier of the battery device 12 along with the carrier identifier to the battery device 12.

In step 66, the battery device 12 stores the carrier identifier received from the service end electronic device 11 in the memory of the battery device 12, and is thus bound to the carrier device 15. In a further embodiment, the battery device 12 also stores the battery identifier received from the service end electronic device 11.

The following steps 67-69 relate to data management at the server side and are optional.

In step 67, the service end electronic device 11 obtains a user identifier corresponding to a user of the carrier device 15, and stores the user identifier in the memory of the service end electronic device 11. According to an embodiment, the service end electronic device 11 is installed with the first application program, and is configured to obtain the user identifier through scanning a barcode associated with the user identifier and displayed on the user end electronic device 14 of the user by executing the first application program. According to an embodiment, the user end electronic device 14 is installed with a second application program downloaded from the cloud server 13 over the communication network 10, and is configured to display the barcode associated with the user identifier after log-in of the user to the second application program. A first-time log-in of the user to the second application program requires the user to complete a registration procedure, including inputting personal information to a registration webpage provided by the second application program, the personal information including information about, for example, a vehicle license, a driver's license, a name, an address and/or a contact number. The barcode associated with the user identifier may be generated dynamically each time the user logs in, with a limited effective time for the sake of security. That is, the barcode generated each time the user logs in to the second application program is different, and is effective only for a limited time (e.g., one hour) before it expires. According to an embodiment, the barcode may be a 1D barcode or a 2D barcode (e.g., a QR code).

In step 68, the service end electronic device 11 sends the carrier identifier of the carrier device 15, the battery identifier of the battery device 12 and the user identifier of the user of the carrier device 15 to the cloud server 13 over the communication network 10.

In step 69, the cloud server 13 receives the carrier identifier, the battery identifier and the user identifier from the service end electronic device 11, and stores the carrier identifier, the battery identifier and the user identifier as an associated (interrelated) group. In an embodiment, the interrelationship of the carrier identifier, the battery identifier and the user identifier is specified in a lookup table stored in the cloud server 13. In this case, the battery device 12 is bound to the carrier device 15 and the user corresponding to the user identifier at the side of the cloud server 13. Afterwards, the service end electronic device 11 may use the battery identifier of the battery device 12 to inquire the identity of the owner/user of the battery device 12 through communication with the cloud server 13. The service end electronic device 11 may also use the battery identifier of the battery device 12 to inquire which carrier device 15 is allowed to use the battery device 12 through communication with the cloud server 13. The cloud server 13 may send a storage complete signal to the service end electronic device 11 after storing the carrier identifier, the battery identifier and the user identifier, and the service end electronic device 11 may delete the carrier identifier, the battery identifier and the user identifier stored therein in response to receiving the storage complete signal.

In addition to easily and rapidly binding a battery device 12 to a carrier device 15, the method disclosed in FIG. 6 is beneficial in that the SoH examination performed in steps 61 and 62 prevents binding of an unhealthy battery device. That is, an EV owner/user is prevented from buying or renting an unhealthy or faulty battery device from the vendor.

One of ordinary skill in the relevant art would appreciate that it is not necessary for steps 61-69 to be performed in exactly the order illustrated in FIG. 6. Specifically, step 64 may be performed before step 63, and step 67 may be performed at any time as long as it is performed before step 68.

Other alterations may be made to the method as well. For example, in an embodiment, step 67 is omitted, and only the carrier identifier and the battery identifier are sent to and stored in the cloud server 13 in steps 68 and 69. As another example, in an embodiment in which the battery information the service end electronic device 11 receives from the battery device 12 in step 61 includes the battery identifier of the battery device 12, step 64 is omitted.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for battery binding that is to be implemented by a service end electronic device, the method comprising steps of:

acquiring battery information from a battery device via near-field communication, the battery information including state of health of the battery device;

determining if the state of health of the battery device is greater than a predetermined threshold;

when it is determined that the state of health is greater than the predetermined threshold, obtaining, through a barcode at one of a position under a seat of a carrier device and a position inside a storage compartment of the carrier device, a carrier identifier corresponding to the carrier device that is capable of being electrically powered; and when it is determined that the state of health is greater than the predetermined threshold, sending the carrier identifier to the battery device, in which a battery identifier is stored, via near-field communication for storage in the battery device.

2. The method of claim 1, wherein the barcode is a Quick Response code.

3. The method of claim 1, further comprising a step of:
when it is determined that the state of health is greater than the predetermined threshold, obtaining the battery identifier corresponding to the battery device;
wherein the step of sending the carrier identifier includes sending the battery identifier thus obtained along with the carrier identifier to the battery device via near-field communication for storage of at least the carrier identifier in the battery device.

4. The method of claim 3, wherein the battery identifier is obtained from a storage of the battery device via near-field communication or obtained through a barcode that is a Quick Response code located on a top portion of the battery device.

5. The method of claim 1, wherein the battery device stores both the battery identifier and the carrier identifier after completion of the step of sending the carrier identifier.

6. The method of claim 1, further comprising a step of:
obtaining a user identifier corresponding to a user of the carrier device in order to bind the battery device to the user.

7. The method of claim 6, wherein the user identifier is obtained through a barcode that is a Quick Response code displayed on a user end electronic device of the user.

8. The method of claim 6, comprising a step of:
sending, to a cloud server in communication with the service end electronic device over a communication network, at least one of the carrier identifier, the user identifier and a battery identifier of the battery device over the communication network for storage in the cloud server, wherein the communication network is the Internet.

9. A system for battery binding, the system comprising:
a carrier device that includes a seat and a storage compartment and that has a barcode at one of a position under said seat and a position inside said storage compartment, the barcode being associated with a carrier identifier corresponding to said carrier device;
a battery device configured to be installed in said carrier device to provide electrical power to said carrier device; and
a service end electronic device configured to communicate with said battery device and to:
acquire battery information from said battery device via near-field communication, the battery information including state of health of said battery device;
determine if the state of health of said battery device is greater than a predetermined threshold;
when it is determined that the state of health is greater than the predetermined threshold, obtain the carrier identifier through the barcode; and
when it is determined that the state of health is greater than the predetermined threshold, send the carrier identifier to said battery device via near-field communication for storage in said battery device.

10. The system of claim 9, wherein the barcode is a Quick Response code.

11. The system of claim 9, wherein said service end electronic device is further configured to:
when it is determined that the state of health is greater than the predetermined threshold, obtain a battery identifier of said battery device from said battery device;
wherein said service end electronic device is to obtain the carrier identifier and send the carrier identifier only when it is determined that the state of health is greater than the predetermined threshold, said service end electronic device sending the battery identifier along with the carrier identifier.

12. The system of claim 11, wherein:
said battery device has a barcode associated with the battery identifier that is a Quick Response code located on a top portion of said battery device; and
said service end electronic device is configured to obtain the battery identifier through the barcode associated with the battery identifier.

13. The system of claim 11, wherein:
said service end electronic device includes a near-field communication module;
said battery device includes a near-field communication module; and
said near-field communication module of said service end electronic device is configured to communicate with said near-field communication module of said battery device in order to send the carrier identifier and the battery identifier to said battery device.

14. The system of claim 9, wherein said battery device stores a battery identifier.

15. The system of claim 9, further comprising:
a cloud server configured to communicate with said service end electronic device over a communication network which is the Internet; and
a user end electronic device configured to communicate with said cloud server over the communication network,
wherein said service end electronic device is installed with a first application program, and is configured to obtain the carrier identifier by executing the first application program,
wherein said user end electronic device is installed with a second application program, and is configured to display a barcode associated with a user identifier corresponding to a user of said carrier device after log-in of the user to the second application program, the barcode that is associated with the user identifier being a Quick Response code,
wherein said service end electronic device is further configured to:
obtain the user identifier through the barcode displayed on said user end electronic device; and
send the carrier identifier, the user identifier and a battery identifier of said battery device to said cloud server over the communication network for storage in said cloud server as an associated group.

* * * * *